(12) United States Patent
Menneking

(10) Patent No.: US 10,486,090 B2
(45) Date of Patent: Nov. 26, 2019

(54) FILTER DEVICE COMPRISING FILTER CANDLE FOR FASTENING AND SEALING FILTER FABRICS AND MEMBRANE TUBES ON A FILTER CANDLE

(71) Applicant: DrM, Dr. Mueller AG, Maennedorf (CH)

(72) Inventor: Klaus Menneking, Waltenschwil (CH)

(73) Assignee: DrM, Dr. Mueller AG, Maennedorf (CH)

( * ) Notice: Subject to any disclaimer, the term of this patent is extended or adjusted under 35 U.S.C. 154(b) by 197 days.

(21) Appl. No.: 15/747,298

(22) PCT Filed: Jul. 6, 2016

(86) PCT No.: PCT/CH2016/000100
§ 371 (c)(1),
(2) Date: Jan. 24, 2018

(87) PCT Pub. No.: WO2017/024417
PCT Pub. Date: Feb. 16, 2017

(65) Prior Publication Data
US 2018/0207556 A1    Jul. 26, 2018

(30) Foreign Application Priority Data
Aug. 7, 2015  (CH) .................................. 1141/15

(51) Int. Cl.
*B01D 29/15* (2006.01)
*B01D 63/06* (2006.01)

(52) U.S. Cl.
CPC ........... *B01D 29/15* (2013.01); *B01D 63/065* (2013.01)

(58) Field of Classification Search
CPC ... B01D 29/0065; B01D 29/15; B01D 63/065
See application file for complete search history.

(56) References Cited

U.S. PATENT DOCUMENTS 5,456,834 A * 10/1995 Bowlsbey ............. B01D 29/111
156/218
5,667,678 A * 9/1997 Dye ................... B01D 17/0202
210/232

(Continued)

FOREIGN PATENT DOCUMENTS

CH          660224      3/1987
DE         3326288      1/1985

(Continued)

OTHER PUBLICATIONS

International Search Report of PCT/CH2016/000100, dated Sep. 23, 2016.

*Primary Examiner* — Ana M Fortuna
(74) *Attorney, Agent, or Firm* — Collard & Roe, P.C.

(57) ABSTRACT

A filter device comprising a filter candle on which filter fabrics and membrane tubes are fastened, consists of a central tube, around which a number of perforated support tubes are situated. The seal prevents deposits of filter cake on the radially projecting clamping mechanism which adversely affect the cake discharge, and the seal ensures, by way of its geometrical form and through the selection of the same type material, a permanent sealing action of the connection and fixing of the filter fabric even during operation with temperature and pressure fluctuations, by eliminating the action of difference material coefficients of expansion.

5 Claims, 1 Drawing Sheet

(56) References Cited

U.S. PATENT DOCUMENTS

| | | | |
|---|---|---|---|
| 7,487,875 B2 * | 2/2009 | Zimmerman | B01D 29/15 210/450 |
| 8,465,654 B2 * | 6/2013 | Leonard | B01D 29/15 210/767 |
| 9,151,423 B2 | 10/2015 | Walz et al. | |

FOREIGN PATENT DOCUMENTS

| | | |
|---|---|---|
| DE | 8903445 | 7/1989 |
| EP | 0066921 | 12/1982 |
| EP | 0761278 | 3/1997 |
| EP | 2515020 | 10/2012 |

* cited by examiner

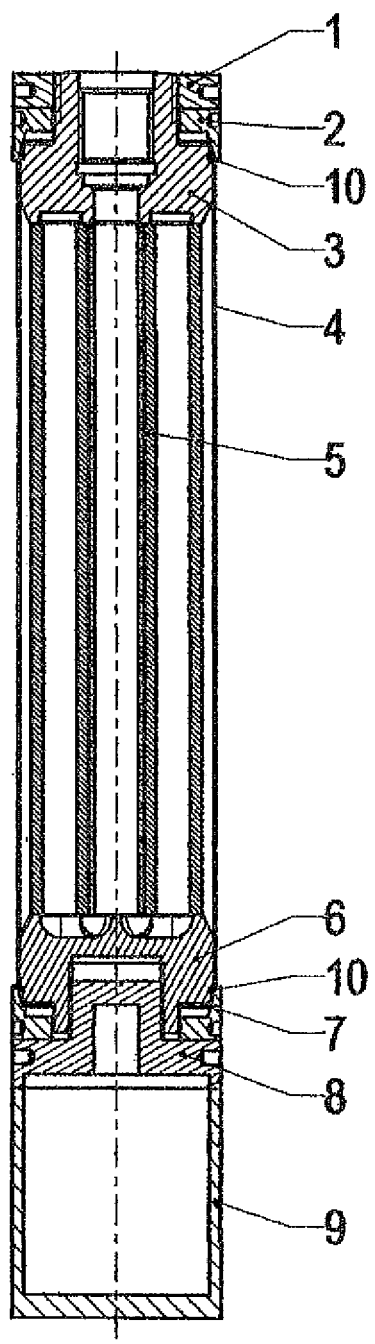

FILTER DEVICE COMPRISING FILTER CANDLE FOR FASTENING AND SEALING FILTER FABRICS AND MEMBRANE TUBES ON A FILTER CANDLE

CROSS REFERENCE TO RELATED APPLICATIONS

This application is the National Stage of PCT/CH2016/000100 filed on Jul. 6, 2016, which claims priority under 35 U.S.C. § 119 of Swiss Application No. 01141/15 filed on Aug. 7, 2015, the disclosures of which are incorporated by reference. The international application under PCT article 21(2) was not published in English.

BACKGROUND OF THE INVENTION

The invention relates to a filter device comprising a filter candle for fastening and sealing filter fabrics and membrane tubes thereon, consisting of a central tube, around which a number of perforated support tubes is situated.

EP 0 066 921 describes a filter element for a pressure filter container of the type consisting of one central tube which is surrounded by a number of support tubes in order to support the filter fabric. A fastening of the filter fabric provided over the tubes is not described.

DE 89 03 445 U describes a simple filter candle for plastic melts, wherein a meshed filter means is slid, between a top part and a base part, over a perforated cylinder and is fastened by means of a clamping ring. The filter candle consists of a single tube. Backwashing is not provided.

DE 33 26 288 describes yet another filter candle for plastic melts. In this case, the sealing takes place by means of conical rings, due to the required high pressures of over 75 bar. In this case as well, neither cake discharge nor backwashing is provided. The known variants of the fastening of filter fabric hoses and membrane tubes on filter candles by means of screw-on clamps or strap clamps comprising radially protruding clamping devices consistently create difficulties with respect to cake discharge in filter candles or other devices in which filter candles are utilized.

Filter cake deposits onto the radially protruding clamping mechanisms, which results in the formation of a bridge between the individual filter candles and limits or even entirely prevents the cleaning of the filter candles.

Moreover, the strap clamps comprising protruding clamping mechanisms generally consist of materials having a greater strength and a lower material expansion coefficient than the material on which the filter fabric is fixed and sealed. During a cyclic temperature and pressure operation, this results in a loosening of the connection and, therefore, a functional failure of the filter candle(s). This is particularly disruptive, since not only is there a loss of production, but repair must also be carried out.

SUMMARY OF THE INVENTION

The problem addressed by the invention is that of providing a device which eliminates the disadvantages described and simplifies and improves a discharge of the filter cake.

The problem is solved according to the invention in that the seal between the filter fabric or the membrane tube and the support tube is effectuated by fastening by means of clamping rings in the upper part of the filter candle and clamping rings which are situated in the lower part of the filter candle and so there are no protruding parts which impede the filter cake as it drops after the end of filtration.

It is advantageous in the upper part of the filter candle when the clamping rings are provided with a thread and with a cone having a thread. A uniform sealing is achieved.

Yet another advantage is that an end cap having a thread is provided below the lower clamping device. As a result, the filter fabric is fixed between the cone and the clamping ring.

Yet another advantage is that an O-ring groove including an O-ring is provided on the candle upper part and on the candle lower part, in the conical sealing surface. The groove for accommodating an O-ring additionally secured for the seal.

The invention is described in greater detail with reference to one drawing.

BRIEF DESCRIPTION OF THE DRAWING FIGURE

FIG. 1 shows a longitudinal section of a filter candle according to the invention.

DETAILED DESCRIPTION OF THE INVENTION

Described in FIG. 1 is a clamping ring 1 having a thread, a clamping ring 2 having a cone, and a candle upper part 3 which is provided with a counter-cone to the clamping ring 2 and also with a thread for accommodating the clamping ring 1. The clamping rings 1 and 2, as well as the candle upper part 3, are situated in the upper part of the filter candle. A candle body 5 functions as the support for the filter fabric. Provided in the candle lower part is a clamping ring having a counter-cone 6 to the clamping ring 7 having a thread with a cone, and an end cap 8 having a thread. If necessary, the counter-cone 6 can be provided with a groove 10 for an O-ring. A chamber 9 can be provided on the end cap 8.

With respect to the filter candle according to the invention, the filter fabric or the membrane tube is positioned on the upper part of the filter candle between the clamping ring 2 having the cone and the candle upper part 3 having the counter-cone to the clamping ring 2. The clamping ring 1 having the thread is screwed together with the candle upper part 3, thereby fastening and sealing the filter fabric or the membrane tube. In the lower part of the filter candle, fastening takes place by means of the clamping ring 7 having a cone and the filter lower part 6 having the counter-cone to the clamping ring 7. A groove for accommodating the O-ring 10 can be provided on the candle upper part 3 and on the candle lower part 6, in the conical sealing surface.

The sealing system according to the invention prevents filter cake from depositing on clamp closures or other radially protruding clamping mechanisms, which negatively affects the cake discharge and, due to the geometric design and identical type of material of the sealing system, the sealing system ensures a permanent tightness of the connection and fixation of the filter fabric even during cyclic temperature and pressure operation, by eliminating the effect of different material expansion coefficients.

What is claimed is:

1. A filter device comprising a filter candle on which filter fabrics and membrane tubes (4) are fastened and sealed, the filter candle comprising a central tube, around which a number of perforated support tubes (5) are situated, wherein fastenings between the filter fabric or the membrane tube (4) and the support tube (5) are provided by means of clamping rings (1), (2), (3) in an upper part of the filter candle and clamping rings (6), (7), (8) in a lower part of the filter candle, so there are no protruding parts which impede filter cake as it drops after the end of filtration.

2. The filter device according to claim 1, wherein in the upper part of the filter candle, a first one of the clamping rings (1) is provided with a thread, a second one of the clamping rings (2) is provided with a cone, and a third one of the clamping rings (3) is provided with a thread and a counter-cone to the second clamping ring (2).

3. The filter device according to claim 1, wherein in the lower part of the filter candle, a first one of the clamping rings (6) is provided with a thread, and a second one of the clamping rings (7) is provided with a cone, and a third one of the clamping rings (8) is provided with a thread.

4. The filter device according to claim 1, wherein an end cap (8) having a thread is provided below the clamping rings on the lower part of the filter candle.

5. The filter device according to claim 4, wherein the candle upper part is provided with a thread and a counter-cone (3), and the candle lower part (6) is provided with a counter-cone (6) having a groove (10).

\* \* \* \* \*